(12) United States Patent
Nagano et al.

(10) Patent No.: US 8,576,528 B2
(45) Date of Patent: Nov. 5, 2013

(54) MATRIX CONVERTER

(75) Inventors: Sumiaki Nagano, Fukuoka (JP);
Makoto Kojyo, Fukuoka (JP); Takahiro Uchino, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 182 days.

(21) Appl. No.: 13/185,513

(22) Filed: Jul. 19, 2011

(65) Prior Publication Data

US 2012/0019970 A1 Jan. 26, 2012

(30) Foreign Application Priority Data

Jul. 20, 2010 (JP) ................................. 2010-163138

(51) Int. Cl.
*H02H 9/04* (2006.01)
(52) U.S. Cl.
USPC .......................................................... 361/91.7
(58) Field of Classification Search
USPC .......................................................... 361/91.7
See application file for complete search history.

(56) References Cited

U.S. PATENT DOCUMENTS

| 7,177,128 B2 * | 2/2007 | Yamamoto et al. | 361/91.7 |
| 7,405,955 B2 * | 7/2008 | Nakahori | 363/52 |
| 2007/0183130 A1 * | 8/2007 | Yamabuchi et al. | 361/728 |

FOREIGN PATENT DOCUMENTS

JP 2009-077518 4/2009

* cited by examiner

*Primary Examiner* — Scott Bauer
(74) *Attorney, Agent, or Firm* — Ditthavong Mori & Steiner, P.C.

(57) ABSTRACT

A matrix converter includes a plurality of semiconductor switch modules, and a plurality of snubber modules each having a plurality of capacitors and a plurality of diodes. Each of the snubber modules has a terminal group projecting outward, a first terminal, and a second terminal. The first and second terminals project from positions different from the terminal group, and are connected to an external circuit provided outside the matrix converter. Terminals of the terminal group are connected to terminals of a corresponding semiconductor switch module. The first terminals of the plurality of snubber modules are connected to one another via a first bus bar, and the second terminals are connected to one another via a second bus bar.

9 Claims, 9 Drawing Sheets

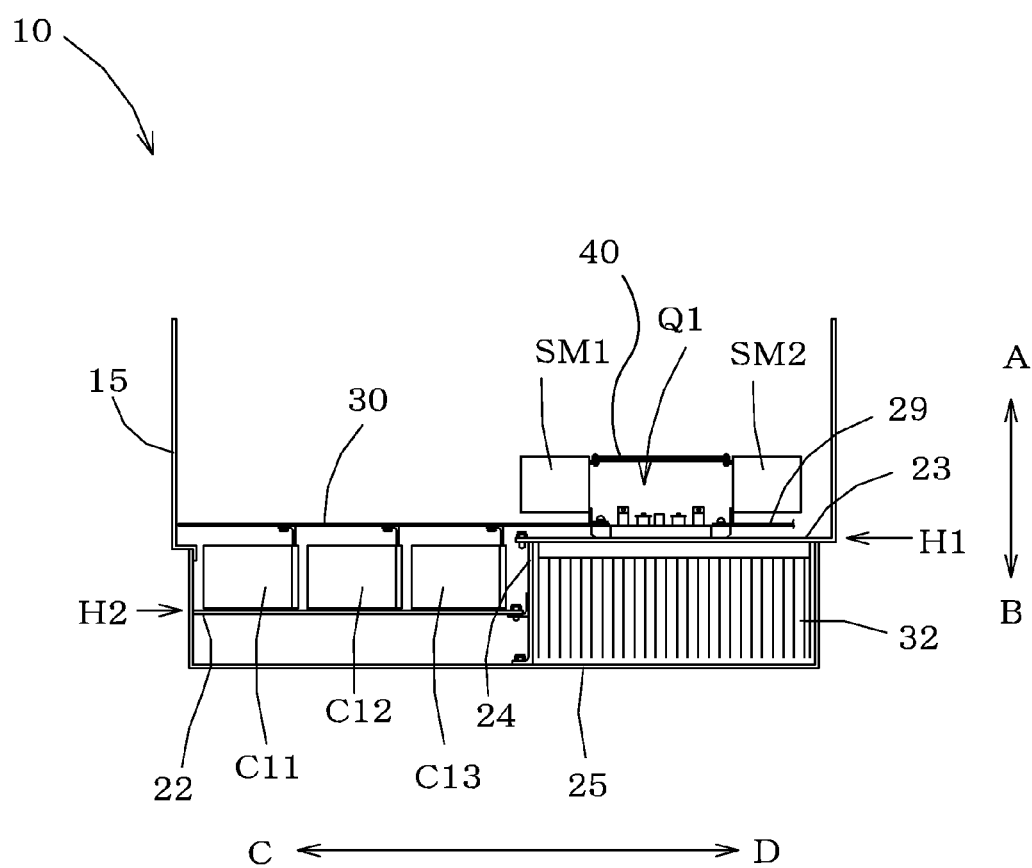

MATRIX CONVERTER

CROSS-REFERENCE TO RELATED APPLICATION

The present application claims priority under 35 U.S.C. §119 to Japanese Patent application no. 2010-163138, filed Jul. 20, 2010. The contents of this application are incorporated herein by reference in their entirety.

BACKGROUND OF THE INVENTION

1. Field of the Invention

The embodiments disclosed herein relate to a matrix converter.

2. Discussion of the Background

Japanese Unexamined Patent Application Publication No. 2009-77518, published Apr. 9, 2009, describes a power converter. The power converter has a housing including a plurality of insulated gate bipolar transistor (IGBT) modules each having a semiconductor bidirectional switch molded thereon with resin. A snubber module is arranged on either side of each of the IGBT modules for absorbing surge voltage caused by the switching of the semiconductor bidirectional switch. Each of the snubber modules is provided with a terminal group projecting downward, and the individual terminals of the terminal groups are connected to the IGBT modules. Further, the snubber modules are fixedly screwed using threaded through holes formed in the main body of the snubber modules in order to prevent the terminals of the snubber modules from being damaged due to the vibration of the power converter.

SUMMARY OF THE INVENTION

An aspect of the present invention provides a matrix converter including a plurality of semiconductor switch modules each having a semiconductor bidirectional switch, and a plurality of snubber modules each having a plurality of capacitors and a plurality of diodes for reducing surge voltage generated by switching of the semiconductor bidirectional switches. Each of the snubber modules has a terminal group projecting outward, a first terminal, and a second terminal. The first terminal and the second terminal project from positions different from the terminal group, and are connected to an external circuit provided outside the matrix converter. Terminals of the terminal group are connected to terminals of a corresponding semiconductor switch module among the semiconductor switch modules. The first terminals of the plurality of snubber modules are connected to one another via a first bus bar, and the second terminals of the plurality of snubber modules are connected to one another via a second bus bar.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a front cross-sectional view illustrating the internal structure of the matrix converter according to the embodiment in which a laminate bus bar is connected;

DESCRIPTION OF THE EMBODIMENTS

Figure 1A:
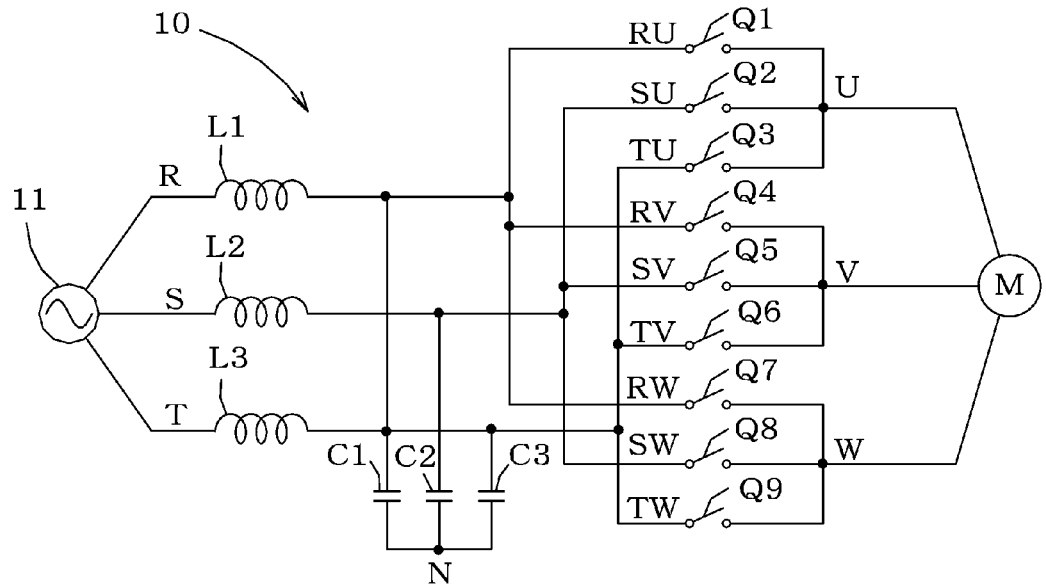
FIG. 1A is an internal connection diagram of a matrix converter according to an embodiment.

Embodiments will now be described with reference to the accompanying drawings, wherein like reference numerals designate corresponding or identical elements throughout the various drawings.

An exemplary embodiment of the present invention will be described with reference to the accompanying drawings. For convenience of description, an upward direction A, a downward direction B, a leftward direction C, a rightward direction D, a forward direction E, and a rearward direction F illustrated in FIGS. 2, 3, and 5 to 7 will be defined. However, matrix converters may be installed in a manner different from that illustrated in the respective figures depending on the actual use of the matrix converters, and, for example, the upward direction illustrated in FIGS. 2, 3, and 5 to 7 may be the forward direction, the downward direction may be the rearward direction, the forward direction may be the downward direction, and the rearward direction may be the upward direction. Furthermore, in each figure, portions that are not related to the description may not be illustrated.

A matrix converter 10 according to an embodiment of the present invention is capable of converting input three-phase alternating current (AC) electric power into AC electric power having a different frequency or voltage. The matrix converter 10 may have a capacity of, for example, 160 kW.

Figure 1B:
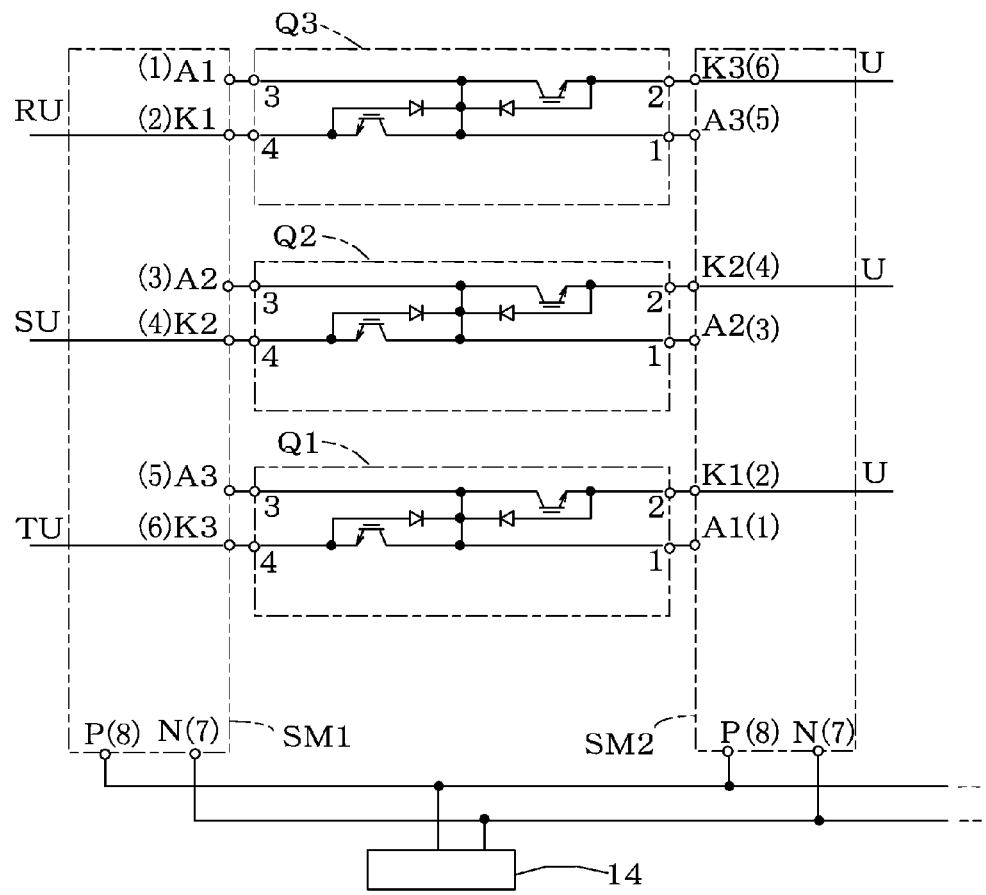
FIG. 1B is a detailed connection diagram of some of IGBT modules illustrated in FIG. 1A.

As illustrated in FIG. 1A, the matrix converter 10 includes first, second, and third AC reactors L1, L2, and L3, capacitors C1, C2, and C3, and IGBT modules (examples of a semiconductor switch module) Q1, Q2, Q3, Q4, Q5, Q6, Q7, Q8, and Q9, and is capable of driving a motor M. The matrix converter 10 further includes snubber modules SM1, SM2, SM3, SM4, SM5, and SM6, as illustrated in FIG. 1B. In FIG. 1B, the snubber modules SM3, SM4, SM5, and SM6 are not illustrated because of their similarity with the snubber modules SM1 and SM2. In FIG. 1B, furthermore, numbers in the parentheses attached to the terminal signs of the snubber modules SM1 and SM2 represent terminal numbers.

The first, second, and third AC reactors L1, L2, and L3 are connected in series with R-phase, S-phase, and T-phase outputs of a three-phase AC power supply 11, respectively.

The capacitors C1, C2, and C3 are Y-connected (star-connected) to the R-phase, S-phase, and T-phase outputs of the first, second, and third AC reactors L1, L2, and L3, respectively. The first, second, and third AC reactors L1, L2, and L3 and the capacitors C1, C2, and C3 form input filters.

In actuality, each of the capacitors C1, C2, and C3 is formed of a plurality of AC capacitors connected in parallel (which are not illustrated in detail in FIG. 1A).

The IGBT modules Q1, Q2, Q3, Q4, Q5, Q6, Q7, Q8, and Q9 are connected to the output side of the first, second, and third AC reactors L1, L2, and L3. Each of the IGBT modules Q1, Q2, Q3, Q4, Q5, Q6, Q7, Q8, and Q9 includes, for example, a semiconductor bidirectional switch molded with resin, and a peripheral circuit board provided in an upper portion of the IGBT module. The semiconductor bidirectional switches of the IGBT modules Q1, Q2, Q3, Q4, Q5, Q6, Q7, Q8, and Q9 are controlled to be turned on and off by a control circuit (not illustrated), and U-phase, V-phase, and W-phase voltages are output.

The snubber modules SM1, SM2, SM3, SM4, SM5, and SM6 are connected to the IGBT modules Q1, Q2, Q3, Q4, Q5, Q6, Q7, Q8, and Q9 via terminal groups each including, for example, an A1 terminal (No. 1 terminal), a K1 terminal (No. 2 terminal), an A2 terminal (No. 3 terminal), a K2 terminal (No. 4 terminal), an A3 terminal (No. 5 terminal), and a K3 terminal (No. 6 terminal) (see FIG. 1B). Each of the snubber modules SM1, SM2, SM3, SM4, SM5, and SM6 incorporates a plurality of diodes and capacitors which form a snubber circuit for absorbing surge voltage caused by the switching of the corresponding semiconductor bidirectional switch. The snubber modules SM1, SM2, SM3, SM4, SM5, and SM6 are further connected to a discharge circuit (an example of an external circuit) 14, which is located outside the matrix converter 10, via N terminals (No. 7 terminals) as examples of a first terminal and P terminals (No. 8 terminals) as examples of a second terminal.

Figure 2:
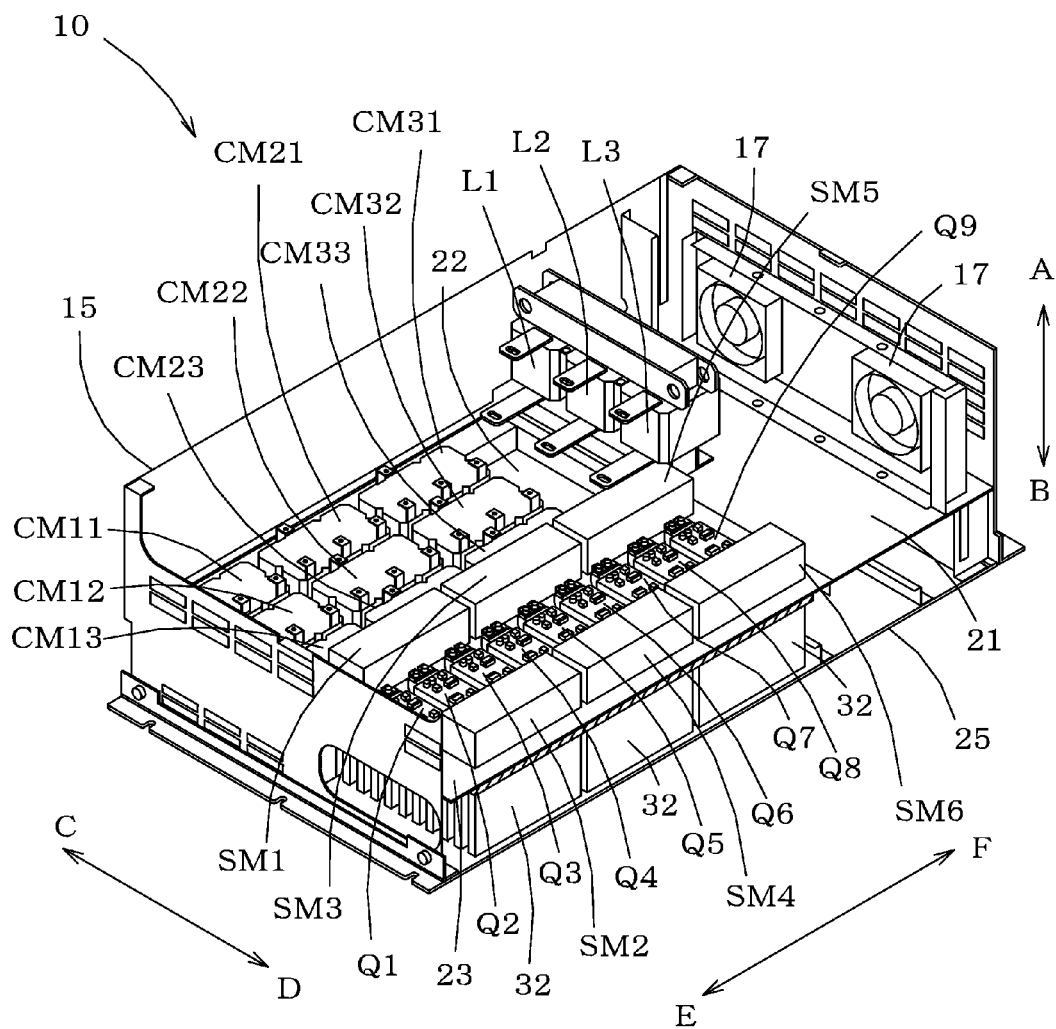
FIG. 2 is a perspective view illustrating the internal structure of the matrix converter according to the embodiment.
Figure 5:
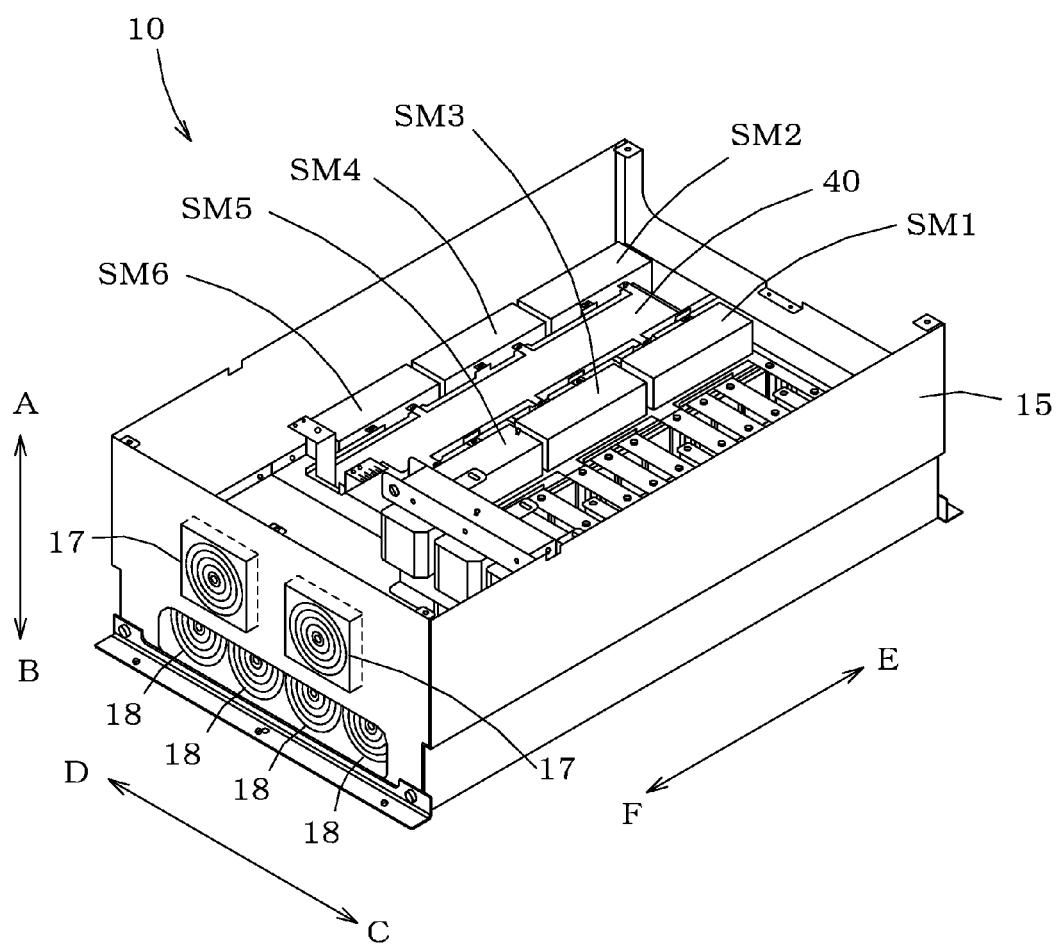
FIG. 5 is a perspective view illustrating the internal structure of the matrix converter according to the embodiment in which a laminate bus bar is connected.

As illustrated in FIG. 2, a housing 15 of the matrix converter 10 includes first, second, and third AC reactors L1, L2, and L3, a plurality of AC capacitor modules CM11, CM12, CM13, CM21, CM22, CM23, CM31, CM32, and CM33, a plurality of IGBT modules Q1, Q2, Q3, Q4, Q5, Q6, Q7, Q8, and Q9, a plurality of snubber modules SM1, SM2, SM3, SM4, SM5, and SM6, and cooling fans 17 and 18 (see FIG. 5).

The first, second, and third AC reactors L1, L2, and L3, the AC capacitor modules CM11, CM12, CM13, CM21, CM22, CM23, CM31, CM32, and CM33, and the IGBT modules Q1, Q2, Q3, Q4, Q5, Q6, Q7, Q8, and Q9 are electrically connected via bus bars (copper bars).

A first partition plate 21 is located in a rear portion of the housing 15 so as to extend substantially horizontally. A second partition plate 22 and a third partition plate 23 located to the right of the second partition plate 22 are provided in a portion of the housing 15, other than the rear portion. The first, second, and third partition plates 21, 22, and 23 allow the internal space of the housing 15 to be partially separated into the upper and lower sections. The first and third partition plates 21 and 23 are located at different positions in the upward/downward direction from the second partition plate 22. The first partition plate 21 is provided at a first upward/downward direction position H1, as illustrated in FIG. 7. The second partition plate 22 is provided at a second upward/downward direction position H2 that is lower than the first upward/downward direction position H1. The third partition plate 23 is provided at the first upward/downward direction position H1. The third partition plate 23 may be provided at a position different from the first upward/downward direction position H1 if the third partition plate 23 is provided at a position higher than the second upward/downward direction position H2.

A fourth partition plate 24 is further provided (see FIG. 7) in a portion of the housing 15, other than the rear portion, so as to extend in the upward direction from a bottom plate 25 of the housing 15 to partially partition the internal space of the housing 15 into right and left sections. The fourth partition plate 24 is coupled to the right end of the second partition plate 22 and the left end of the third partition plate 23.

Next, the cooling fans 17 and 18, the first, second, and third AC reactors L1, L2, and L3, the AC capacitor modules CM11, CM12, CM13, CM21, CM22, CM23, CM31, CM32, and CM33, the IGBT modules Q1, Q2, Q3, Q4, Q5, Q6, Q7, Q8, and Q9, and the snubber modules SM1, SM2, SM3, SM4, SM5, and SM6 housed in the housing 15 will be described in detail.

The cooling fans 17 and 18 are capable of generating cool air for cooling the inside of the housing 15. The generated cool air allows the heat in the housing 15 to be dissipated from the rear of the housing 15. It is noted that heat may be dissipated upward depending on the use of the matrix converter 10. As illustrated in FIG. 2, the cooling fans 17 are arranged on the upper side of the rear end portion of the housing 15. As illustrated in FIG. 5, the cooling fans 18 are arranged below the cooling fans 17.

Figure 3:
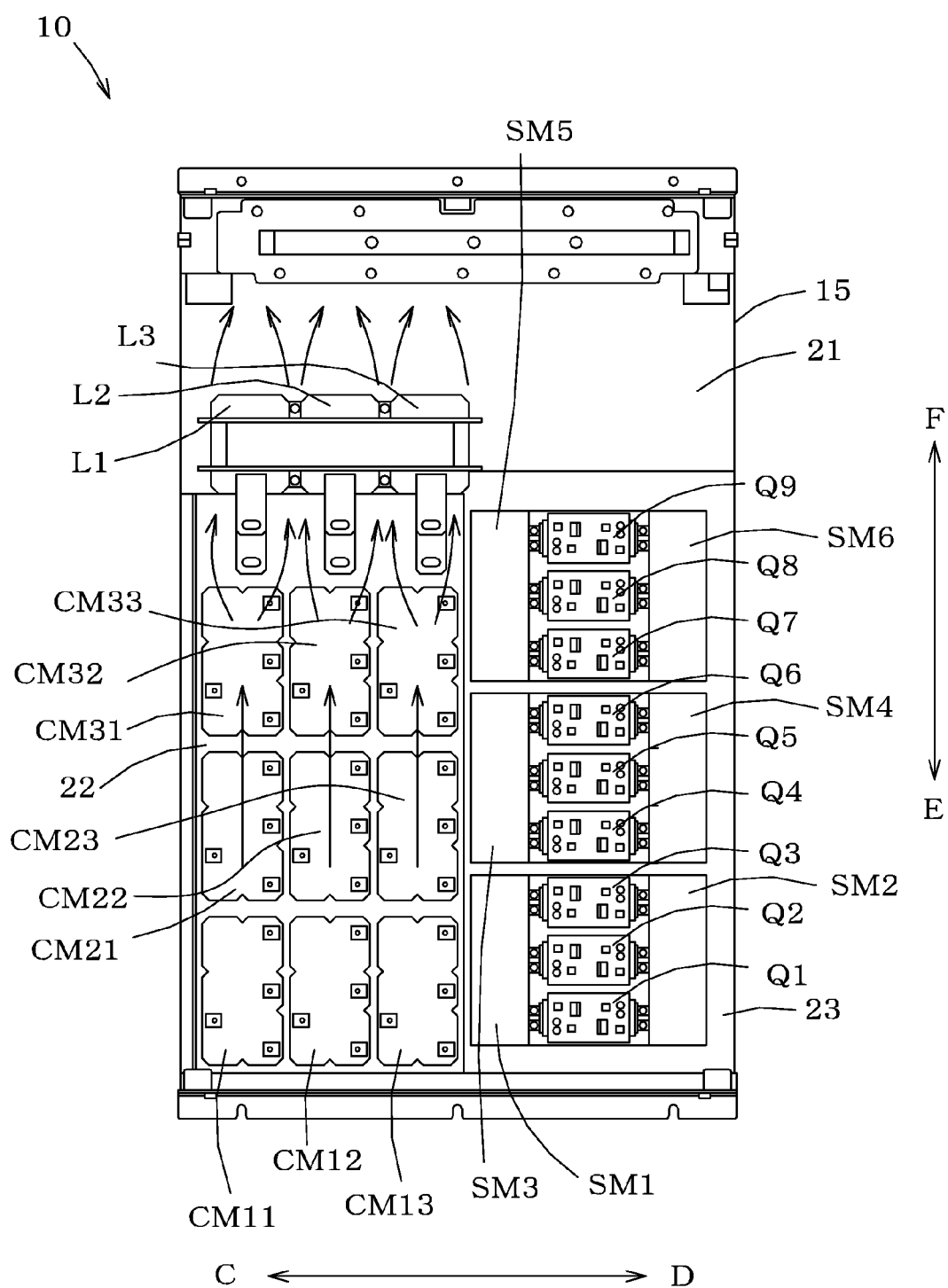
FIG. 3 is a plan view illustrating the internal structure of the matrix converter according to the embodiment.

The first, second, and third AC reactors L1, L2, and L3 are fixed to the first partition plate 21, and are arranged in a portion near the rear of the housing 15 with respect to the center in the forward/rearward direction. Further, as illustrated in FIG. 3, the first, second, and third AC reactors L1, L2, and L3 are arranged side-by-side in such a direction as to intersect the direction of the flow of the cool air generated by the cooling fans 17 within a range of, for example, 70 to 110 degrees. Accordingly, the cool air substantially equally hits the first, second, and third AC reactors L1, L2, and L3, resulting in satisfactory cooling efficiency being maintained. The direction of the flow of the cool air may intersect the direction in which the first, second, and third AC reactors L1, L2, and L3 are arranged to the extent so as not to select larger AC reactors because of degraded cooling efficiency.

The first, second, and third AC reactors L1, L2, and L3 are integrally formed.

Each of the first, second, and third AC reactors L1, L2, and L3 has a No. 1 terminal and a No. 2 terminal in an upper portion and a lower portion, respectively, so as to project forward (see FIG. 3). Each of the No. 1 terminals and the No. 2 terminals has a hole in the leading end thereof through which the terminal is connected to a bus bar. Bus bars leading to the input side (power supply side) are connected to the No. 1 terminals. Bus bars leading to the AC capacitor modules CM11, CM12, CM13, CM21, CM22, CM23, CM31, CM32, and CM33 are connected to the No. 2 terminals.

The capacitors C1, C2, and C3 illustrated in FIG. 1A are implemented by, for example, nine AC capacitor modules CM11, CM12, CM13, CM21, CM22, CM23, CM31, CM32, and CM33 as illustrated in FIGS. 2 and 3.

Each of the AC capacitor modules CM11, CM12, CM13, CM21, CM22, CM23, CM31, CM32, and CM33 has, for example, three AC capacitors. In this manner, the capacitors C1, C2, and C3 illustrated in FIG. 1A are separated into the plurality of AC capacitor modules CM11, CM12, CM13, CM21, CM22, CM23, CM31, CM32, and CM33, thus making it easy to change the capacitance of the capacitors C1, C2, and C3. For example, the capacitance of the capacitors C1, C2, and C3 may be reduced by removing the corresponding AC capacitor modules.

The AC capacitor modules CM11, CM12, and CM13 are fixed to the second partition plate 22, and are arranged on the front side of the housing 15. The AC capacitor modules CM21, CM22, and CM23 are fixed to the second partition plate 22, and are arranged behind the AC capacitor modules CM11, CM12, and CM13, respectively. The AC capacitor modules CM31, CM32, and CM33 are fixed to the second partition plate 22, and are arranged behind the AC capacitor modules CM21, CM22, and CM23, respectively. Further, the AC capacitor modules CM31, CM32, and CM33 are arranged in front of the first, second, and third AC reactors L1, L2, and L3, respectively, when viewed in plan.

The AC capacitor modules CM11, CM12, CM13, CM21, CM22, CM23, CM31, CM32, and CM33 are fixed to the second partition plate 22, and are therefore fixed at positions lower than the first, second, and third AC reactors L1, L2, and L3 fixed to the first partition plate 21. Thus, a space is formed in front of the first, second, and third AC reactors L1, L2, and L3 and above the AC capacitor modules CM11, CM12, CM13, CM21, CM22, CM23, CM31, CM32, and CM33.

Each of the AC capacitor modules CM11, CM12, CM13, CM21, CM22, CM23, CM31, CM32, and CM33 has a No. 1 terminal, a No. 2 terminal, a No. 3 terminal, and a No. 4 terminal that project upward (see FIG. 3). Of the four terminals, the No. 1 terminal is provided on the left side, and is connected to a capacitor neutral point N (see FIG. 1A). The No. 2 terminal, the No. 3 terminal, and the No. 4 terminal are provided on the right side, and are connected to the No. 2 terminal (R-phase) of the first AC reactor L1, the No. 2 terminal (S-phase) of the second AC reactor L2, and the No. 2 terminal (T-phase) of the third AC reactor L3, respectively. Three AC capacitors provided in each of the AC capacitor modules CM11, CM12, CM13, CM21, CM22, CM23, CM31, CM32, and CM33 have terminals internally connected to the No. 1 terminal of the AC capacitor module, and second terminals internally connected to the No. 2 terminal, the No. 3 terminal, and the No. 4 terminal of the AC capacitor module.

A leading end of each of the No. 1 terminal, the No. 2 terminal, the No. 3 terminal, and the No. 4 terminal is bent inward, and has a threaded hole therein through which a bus bar 30 (see FIG. 7) is connected.

The IGBT modules Q1, Q2, Q3, Q4, Q5, Q6, Q7, Q8, and Q9 are fixed to the third partition plate 23, and are arranged side-by-side to the right of the AC capacitor modules CM11, CM12, CM13, CM21, CM22, CM23, CM31, CM32, and CM33 in the forward/rearward direction.

The IGBT modules Q1, Q2, Q3, Q4, Q5, Q6, Q7, Q8, and Q9 are fixed to the third partition plate 23, and are therefore fixed at positions higher than the body portion except for the terminals of the AC capacitor modules CM11, CM12, CM13, CM21, CM22, CM23, CM31, CM32, and CM33 fixed to the second partition plate 22.

Each of the IGBT modules Q1, Q2, Q3, Q4, Q5, Q6, Q7, Q8, and Q9 has two threaded terminals on either side thereof when viewed in plan. More specifically, each of the IGBT modules Q1, Q2, Q3, Q4, Q5, Q6, Q7, Q8, and Q9 has a No. 1 terminal and a No. 2 terminal on the right side thereof, and a No. 3 terminal and a No. 4 terminal on the left side thereof when viewed in plan (see FIG. 3). Bus bars 29 (see FIG. 7) leading to the load side and the terminals of the snubber modules SM2, SM4, and SM6 are screwed together with and connected to the No. 2 terminals of the IGBT modules Q1, Q2, Q3, Q4, Q5, Q6, Q7, Q8, and Q9. Bus bars 30 extending from the terminals of the AC capacitor modules CM11, CM12, CM13, CM21, CM22, CM23, CM31, CM32, and CM33, and the terminals of the snubber modules SM1, SM3, and SM5 are screwed together with and are connected to the No. 4 terminals. The No. 1 terminals and the No. 3 terminals are connected only to the snubber modules SM1, SM2, SM3, SM4, SM5, and SM6. The connection between the IGBT modules Q1, Q2, Q3, Q4, Q5, Q6, Q7, Q8, and Q9 and the snubber modules SM1, SM2, SM3, SM4, SM5, and SM6 will be described in detail below.

Here, as described above, the AC capacitor modules CM11, CM12, CM13, CM21, CM22, CM23, CM31, CM32, and CM33 are provided on the second partition plate 22, and the IGBT modules Q1, Q2, Q3, Q4, Q5, Q6, Q7, Q8, and Q9 are provided on the third partition plate 23. Therefore, the leading ends of the terminals of the AC capacitor modules CM11, CM12, CM13, CM21, CM22, CM23, CM31, CM32, and CM33 are substantially at the same height position as the terminals of the IGBT modules Q1, Q2, Q3, Q4, Q5, Q6, Q7, Q8, and Q9 to be connected to the leading ends of the terminals of the AC capacitor modules CM11, CM12, CM13, CM21, CM22, CM23, CM31, CM32, and CM33. Consequently, as illustrated in FIG. 7, the bus bars 30 that connect the terminals of the AC capacitor modules CM11, CM12, CM13, CM21, CM22, CM23, CM31, CM32, and CM33 to the No. 4 terminals of the IGBT modules Q1, Q2, Q3, Q4, Q5, Q6, Q7, Q8, and Q9 are formed linearly when viewed from the front. Since the linear bus bars 30 are not bent in the middle in the thickness direction, inductance is small. Therefore, surge voltage is reduced. The term "substantially at the same height position" means that a shift with which the terminals of the AC capacitor modules can be connected to the terminals of the IGBT modules by using the linear bus bars that are not bent in the middle in the thickness direction is permissible. Therefore, for example, a shift of 5 mm or less is permissible.

Heat sinks 32 are provided on a lower surface of the third partition plate 23 opposite the side on which the IGBT modules Q1, Q2, Q3, Q4, Q5, Q6, Q7, Q8, and Q9 are provided (see FIGS. 2 and 7). The heat sinks 32 allow the heat generated from the IGBT modules Q1, Q2, Q3, Q4, Q5, Q6, Q7, Q8, and Q9 to be dissipated. The heat sinks 32 are cooled mainly by the cooling fans 18.

The snubber modules SM1 to SM6 are arranged on both right and left sides of the IGBT modules Q1, Q2, Q3, Q4, Q5, Q6, Q7, Q8, and Q9. Specifically, one snubber module is arranged for every three IGBT modules on their right or left side. For example, the snubber module SM1 and SM2 are arranged on the left and right sides, respectively, of the IGBT modules Q1, Q2, and Q3 when viewed in plan.

Figure 4:
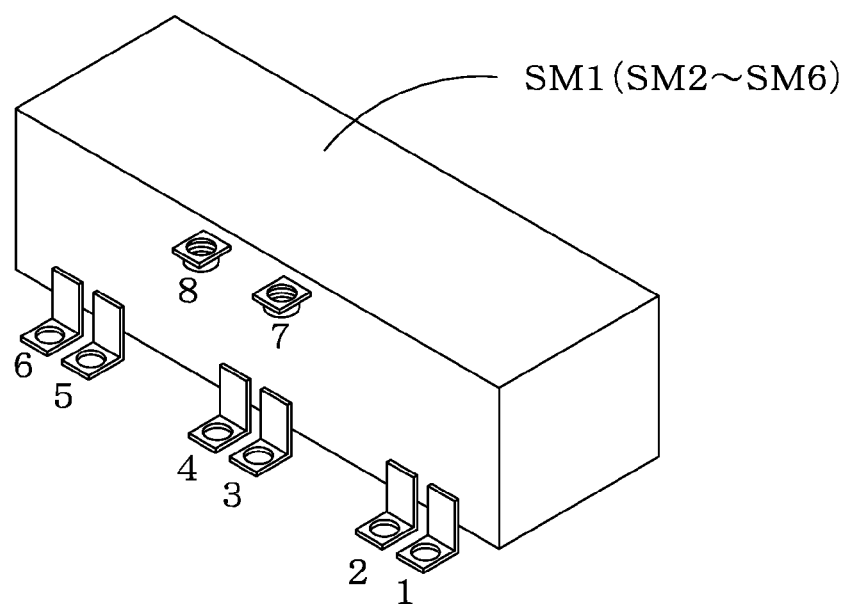
FIG. 4 is a perspective view of snubber modules provided in the matrix converter according to the embodiment.

As illustrated in FIG. 4, each of the snubber modules SM1, SM2, SM3, SM4, SM5, and SM6 has a rectangular parallelepiped shape. In FIG. 4, a number assigned to each terminal represents a terminal number. The No. 1 terminal, the No. 2 terminal, the No. 3 terminal, the No. 4 terminal, the No. 5 terminal, and the No. 6 terminals of the terminal group of each of the snubber modules SM1, SM2, SM3, SM4, SM5, and SM6 are provided so as to project downward from the lower edge (an example of a first edge). The leading ends of the respective terminals are bent outward. Further, downward projecting portions of the terminals that are tightened together with the bus bar and are therefore fixed to the terminals (No. 2 terminal and No. 4 terminal) of the IGBT modules are formed to be shorter than downward projecting portions of the terminals that are tightened together with the bus bar and are fixed to the terminals (No. 1 terminal and No. 3 terminal) of the IGBT modules (see FIG. 9). Thus, the unevenness in height of the surface on which the terminals of the snubber modules SM1, SM2, SM3, SM4, SM5, and SM6 are fixed can be absorbed.

The No. 7 terminal and the No. 8 terminal of each of the snubber modules SM1, SM2, SM3, SM4, SM5, and SM6 are provided so as to project in a direction in which the leading ends of the NO. 1 terminal, NO. 2 terminal, No. 3 terminal, No. 4 terminal, No. 5 terminal, and No. 6 terminal are bent, from the upper edge (an example of a second edge) different from the position from which the terminal group projects. Furthermore, the No. 7 terminal and the No. 8 terminal are provided in a center portion in the longitudinal direction of each of the snubber modules SM1, SM2, SM3, SM4, SM5, and SM6 when viewed in plan. The No. 7 terminals and the No. 8 terminals have threaded holes therein into which a laminate bus bar 40 described below is fixed.

Next, the fixing of the snubber modules SM1, SM2, SM3, SM4, SM5, and SM6 will be described in detail.

As described above, each of the snubber modules SM1, SM2, SM3, SM4, SM5, and SM6 is connected to an IGBT module via a terminal group (NO. 1 terminal, NO. 2 terminal, No. 3 terminal, No. 4 terminal, No. 5 terminal, and No. 6 terminal).

Specifically, the No. 1 terminal and No. 2 terminal of the snubber module SM1 are connected to the No. 3 terminal and No. 4 terminal of the IGBT module Q3, respectively. The No. 3 terminal and No. 4 terminal of the snubber module SM1 are connected to the No. 3 terminal and No. 4 terminal of the IGBT module Q2, respectively.

The No. 5 terminal and No. 6 terminal of the snubber module SM1 are connected to the No. 3 terminal and No. 4 terminal of the IGBT module Q1, respectively.

Further, the No. 1 terminal and No. 2 terminal of the snubber module SM2 are connected to the No. 1 terminal and No. 2 terminal of the IGBT module Q1, respectively. The No. 3 terminal and No. 4 terminal of the snubber module SM2 are connected to the No. 1 terminal and No. 2 terminal of the IGBT module Q2, respectively. The No. 5 terminal and No. 6 terminal of the snubber module SM2 are connected to the No. 1 terminal and No. 2 terminal of the IGBT module Q3, respectively.

The snubber module SM3 is connected to the IGBT modules Q4, Q5, and Q6 and the snubber module SM5 is connected to the IGBT modules Q7, Q8, and Q9 in a manner similar to that of the snubber module SM1.

The snubber module SM4 is connected to the IGBT modules Q4, Q5, and Q6 and the snubber module SM6 is connected to the IGBT modules Q7, Q8, and Q9 in a manner similar to that of the snubber module SM2.

Figure 6:
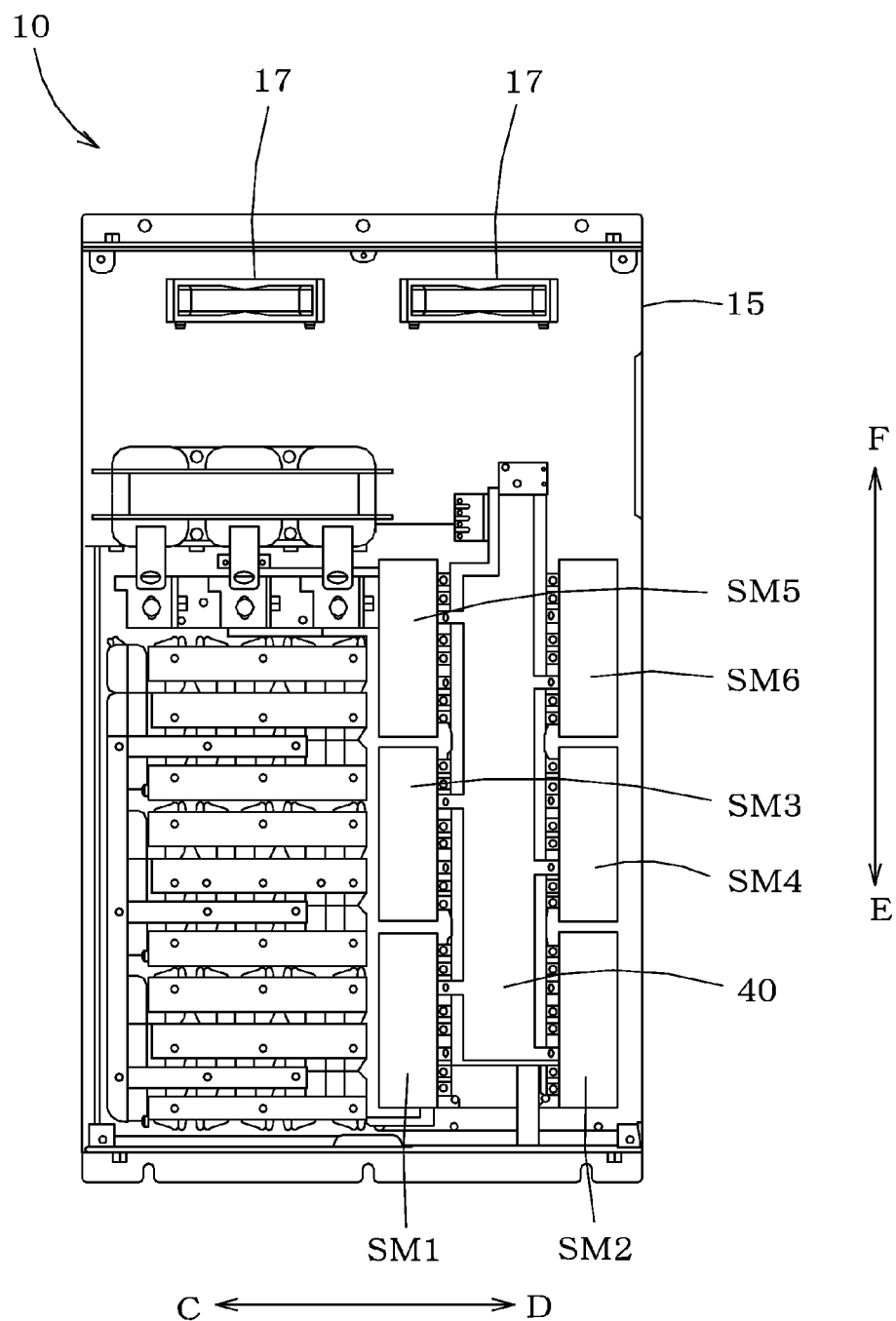
FIG. 6 is a plan view illustrating the internal structure of the matrix converter according to the embodiment in which a laminate bus bar is connected.

Meanwhile, as illustrated in FIGS. 5 and 6, the No. 7 terminals of the snubber modules SM1, SM2, SM3, SM4, SM5, and SM6 are connected to one another via the laminate bus bar 40. Further, the No. 8 terminals of the snubber modules SM1, SM2, SM3, SM4, SM5, and SM6 are also connected to one another via the laminate bus bar 40.

Here, the laminate bus bar 40 will be described.

Figure 8A:
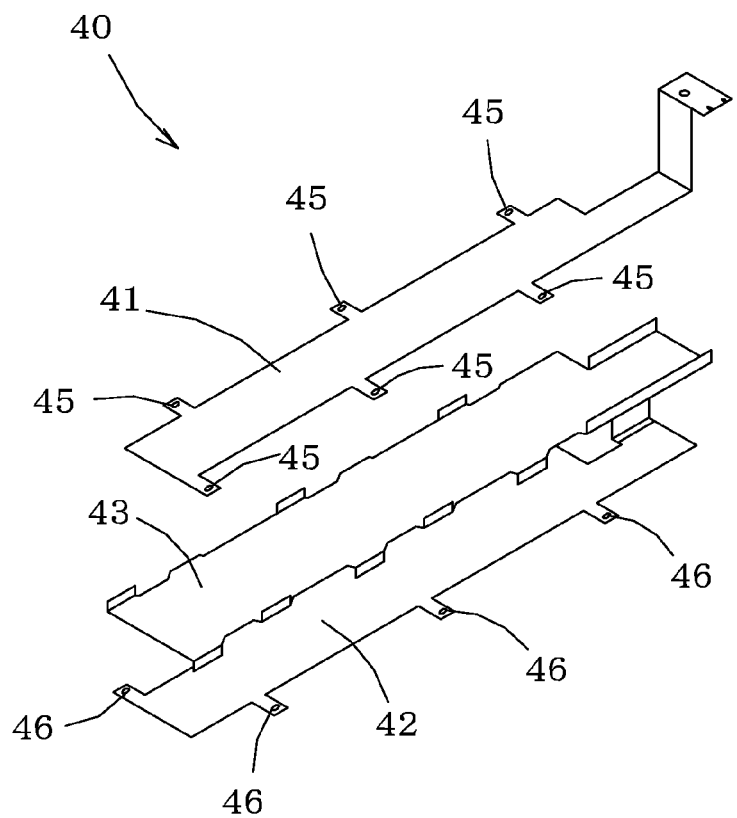
FIGS. 8A and 8B are an exploded view and a plan view, respectively, of a laminate bus bar in the matrix converter according to the embodiment.
Figure 8B:
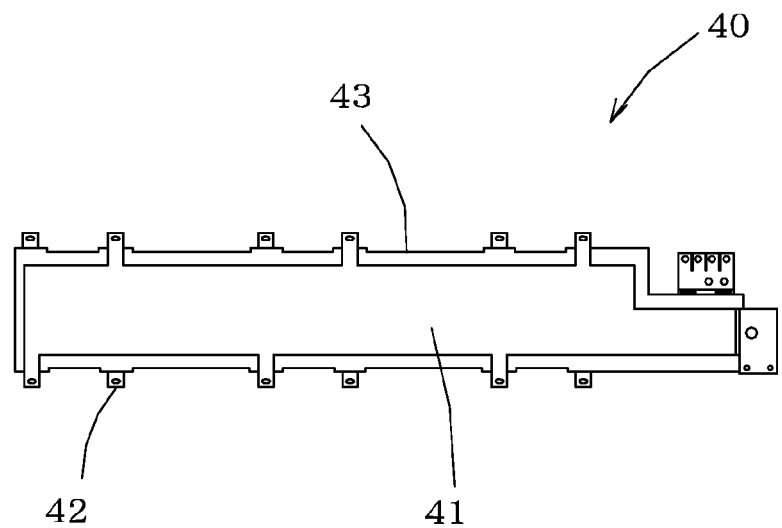

As illustrated in FIGS. 8A and 8B, the laminate bus bar 40 is formed by stacking a first bus bar 41, an insulator 43, and a second bus bar 42 in order.

The first bus bar 41 serves to connect the No. 7 terminals of the snubber modules SM1 to SM6 to one another. The first bus bar 41 may be a flat copper plate, except for an end thereof, and has three projecting portions 45 formed on either side thereof so as to project outward in the width direction. Each of the projecting portions 45 has a hole, and the first bus bar 41 is screw-connected to the No. 7 terminals of the snubber modules SM1, SM2, SM3, SM4, SM5, and SM6 using the holes in the projecting portions 45.

The second bus bar 42 serves to connect the No. 8 terminals of the snubber modules SM1, SM2, SM3, SM4, SM5, and SM6 to each other. The second bus bar 42 may be a flat copper plate, except for an end thereof, and has three projecting portions 46 formed on either side thereof so as to project outward in the width direction. Each of the projecting portions 46 has a hole, and the second bus bar 42 is screw-connected to the No. 8 terminals of the snubber modules SM1, SM2, SM3, SM4, SM5, and SM6 using the holes in the projecting portions 46.

The insulator 43 serves to prevent short-circuiting between the first bus bar 41 and the second bus bar 42. The insulator 43 may be formed of, for example, aramid paper.

Each of the leading ends of the No. 7 terminals of the snubber modules SM1, SM2, SM3, SM4, SM5, and SM6 has a threaded hole through which the laminate bus bar 40 is to be connected, and the threaded holes in the leading ends of the No. 7 terminals of the snubber modules SM1, SM2, SM3, SM4, SM5, and SM6 are formed at positions higher than threaded holes in the No. 8 terminals by an amount corresponding to the thickness of the first bus bar 41. Therefore, the No. 7 terminals and the No. 8 terminals of the snubber modules SM1, SM2, SM3, SM4, SM5, and SM6 are connected via the flat plate-shaped laminate bus bar 40 that is not bent in the thickness direction. Consequently, wiring inductance is reduced and surge voltage is reduced. The positions at which the first and second bus bars 41 and 42 are stacked may also be reversed so that the relationship between the height positions of the No. 7 terminals and the No. 8 terminals of the snubber modules SM1, SM2, SM3, SM4, SM5, and SM6 can be reversed.

The snubber modules SM1, SM2, SM3, SM4, SM5, and SM6 are fixed in the manner as illustrated in FIG. 7, when viewed from the front of the housing 15. That is, each of the snubber modules SM1, SM2, SM3, SM4, SM5, and SM6 is fixed by the No. 1 terminal, the No. 2 terminal, the No. 3 terminal, the No. 4 terminal, the No. 5 terminal, and the No. 6 terminal at the lower edge thereof.

The snubber modules SM1, SM2, SM3, SM4, SM5, and SM6 are also fixed to each other at the upper edges thereof via the laminate bus bar 40 connected to the No. 7 terminals and the No. 8 terminals. Therefore, anti-vibration performance can be improved in contrast to the case where the snubber modules SM1, SM2, SM3, SM4, SM5, and SM6 are fixed only by using the No. 1 terminals, the No. 2 terminals, the No. 3 terminals, the No. 4 terminals, the No. 5 terminals, and the No. 6 terminals, thus preventing the No. 1 terminals, the No. 2 terminals, the No. 3 terminals, the No. 4 terminals, the No. 5 terminals, and the No. 6 terminals from being damaged. Furthermore, it is only required to connect the laminate bus bar 40 to realize both electrical connection and mechanical fixing, resulting in simplified assembly of the matrix converter 10.

Moreover, a space A extending from the front portion to the rear portion of the housing 15 (see FIG. 9) is formed by the IGBT modules Q1, Q2, Q3, Q4, Q5, Q6, Q7, Q8, and Q9 provided in a lower portion, the snubber modules SM1, SM2, SM3, SM4, SM5, and SM6 provided on the right and left sides, and the laminate bus bar 40 provided in an upper portion. The cool air generated by the cooling fans 17 passes through the space A from the front to rear of the housing 15, thus allowing the heat generated by the IGBT modules SM1, SM2, SM3, SM4, SM5, and SM6 to be dissipated. The IGBT modules Q1, Q2, Q3, Q4, Q5, Q6, Q7, Q8, and Q9 are also cooled not only by the heat sinks 32 but also by the cool air passing though the space A. Thus, the cooling efficiency of the IGBT modules Q1, Q2, Q3, Q4, Q5, Q6, Q7, Q8, and Q9 can further be improved.

Figure 9:
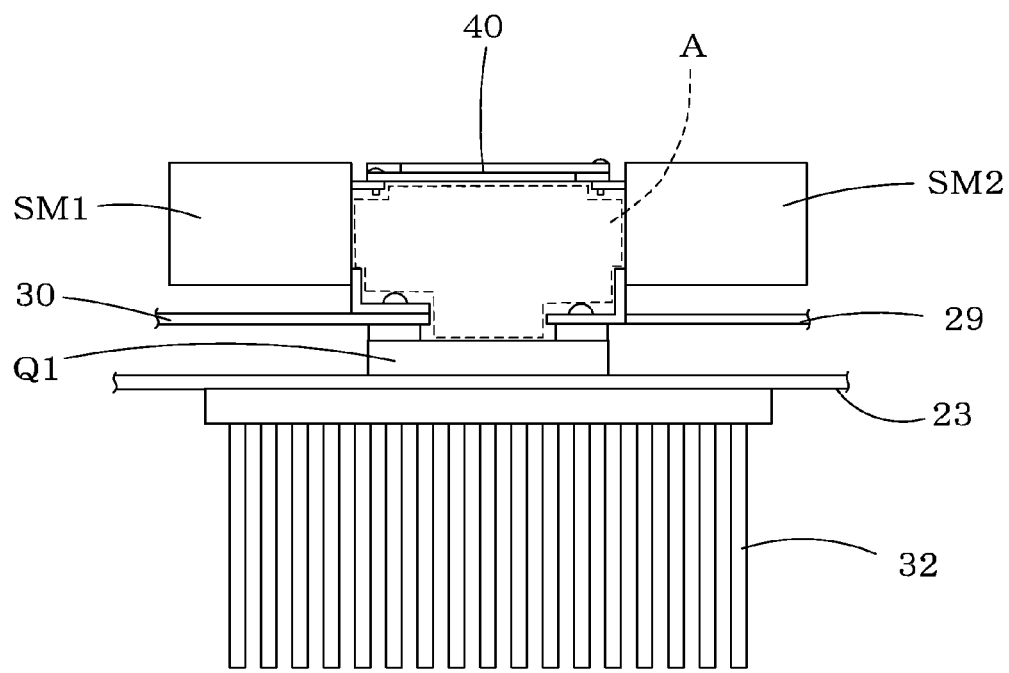
FIG. 9 is a diagram illustrating the matrix converter according to the embodiment in which snubber modules are fixed.

In FIG. 9, the illustration of the insulator 43 of the laminate bus bar 40 is omitted.

It is to be understood that the present invention is not limited to the foregoing embodiment, and various modifications can be made without departing from the scope of the present invention. For example, any combination of the foregoing embodiment and some or all the modifications described above to implement the present invention may also fall within the technical scope of the present invention.

Terminal groups of snubber modules, first terminals, and second terminals may be provided in locations other than those illustrated in the foregoing embodiment. For example, a terminal group may project from the center portion of one surface of a snubber module, and may be fixed to an IGBT module. Further, a first terminal and a second terminal may project from the center portion of another surface, and may be fixed to each other via a laminate bus bar. That is, a terminal group of a snubber module may be fixed to a semiconductor switch module and a first terminal and a second terminal provided at different positions from the terminal group may be fixed via a first bus bar and a second bus bar, respectively, thus improving anti-vibration performance of a snubber module in contrast to the case where a snubber module is fixed only using a terminal group.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A matrix converter comprising:
a plurality of semiconductor switch modules each having a semiconductor bidirectional switch; and
a plurality of snubber modules each having a plurality of capacitors and a plurality of diodes for reducing surge voltage generated by switching of the semiconductor bidirectional switches,
wherein each of the snubber modules has a terminal group projecting outward, a first terminal, and a second terminal, the first terminal and the second terminal projecting from positions different from the terminal group and being connected to an external circuit provided outside the matrix converter,
wherein terminals of the terminal group are connected to terminals of a corresponding semiconductor switch module among the semiconductor switch modules,
wherein the first terminals of the plurality of snubber modules are connected to one another via a first bus bar, and the second terminals of the plurality of snubber modules are connected to one another via a second bus bar,
wherein the first terminals are connected to a discharge circuit via the first bus bar, and
wherein the second terminals are connected to the discharge circuit via the second bus bar.

2. The matrix converter according to claim 1, wherein the terminal groups project from first edges of the snubber modules, and
wherein the first terminals and the second terminals project from second edges located at positions higher than the first edges.

3. The matrix converter according to claim 1, wherein in each of the snubber modules, the first terminal and the second terminal are spaced apart from the terminal group in a first direction along a side surface of each of the snubber modules, and
wherein the second bus bar is provided between the first bus bar and the semiconductor switch modules in the first direction.

4. The matrix converter according to claim 3, wherein in each of the snubber modules, the first terminal is spaced apart from the second terminal in a second direction along the side surface of each of the snubber modules, the second direction being perpendicular to the first direction, and
wherein the first bus bar and the second bus bar extend in the second direction.

5. The matrix converter according to claim 3, further comprising:
a cooling fan to generate cooling air,
wherein the second bus bar is spaced apart from the semiconductor switch modules to define, between the second bus bar and the semiconductor switch modules, a space through which the cooling air generated by the cooling fan is to pass.

6. The matrix converter according to claim 1, wherein the first bus bar and the second bus bar are provided above the semiconductor switch modules.

7. A matrix converter comprising:
a plurality of semiconductor switch modules each having a semiconductor bidirectional switch; and
a plurality of snubber modules each having a plurality of capacitors and a plurality of diodes for reducing surge voltage generated by switching of the semiconductor bidirectional switches,
wherein each of the snubber modules has a terminal group projecting outward, a first terminal, and a second terminal, the first terminal and the second terminal projecting from positions different from the terminal group and being connected to an external circuit provided outside the matrix converter,
wherein terminals of the terminal group are connected to terminals of a corresponding semiconductor switch module among the semiconductor switch modules,
wherein the first terminals of the plurality of snubber modules are connected to one another via a first bus bar, and the second terminals of the plurality of snubber modules are connected to one another via a second bus bar,
wherein the terminal groups project from first edges of the snubber modules,
wherein the first terminals and the second terminals project from second edges located at positions higher than the first edges, and
wherein the first terminals and the second terminals are arranged at positions where the first terminals and the second terminals can be connected via a laminate bus bar, the laminate bus bar being formed by stacking the first bus bar, an insulator, and the second bus bar in order.

8. The matrix converter according to claim 7, wherein the terminal group of each of the snubber modules has six terminals having a leading end bent outward, and each of the six terminals projects downward from the first edge of the corresponding one of the snubber modules,
wherein each of the semiconductor switch modules has two threaded terminals on either side thereof, and
wherein one of the snubber modules is arranged on each side of every three of the semiconductor switch modules when viewed in plan so that the snubber modules face each other, and two terminals of the terminal group of each of the snubber modules are fixed to two terminals on one side of a corresponding one of the semiconductor switch modules.

9. The matrix converter according to claim 7, wherein the insulator is formed of aramid paper.

* * * * *